(12) United States Patent
Draht et al.

(10) Patent No.: US 10,589,374 B2
(45) Date of Patent: Mar. 17, 2020

(54) WELDING AUXILIARY JOINING PART WITH A PLASTICALLY DEFORMABLE TIP REGION; METHOD FOR CONNECTING COMPONENTS WITH THIS WELDING AUXILIARY JOINING PART

(71) Applicant: BÖLLHOFF VERBINDUNGSTECHNIK GMBH, Bielefeld (DE)

(72) Inventors: Torsten Draht, Schloβ Holte-Stukenbrock (DE); Sergej Hartwig-Biglau, Löhne (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 544 days.

(21) Appl. No.: 14/404,617

(22) PCT Filed: May 24, 2013

(86) PCT No.: PCT/EP2013/060709
§ 371 (c)(1),
(2) Date: Nov. 29, 2014

(87) PCT Pub. No.: WO2013/178542
PCT Pub. Date: Dec. 5, 2013

(65) Prior Publication Data
US 2015/0144602 A1    May 28, 2015

(30) Foreign Application Priority Data

May 31, 2012   (DE) .................. 10 2012 010 870

(51) Int. Cl.
*B23K 11/00* (2006.01)
*B21J 15/02* (2006.01)
(Continued)

(52) U.S. Cl.
CPC ......... *B23K 11/0053* (2013.01); *B21J 15/025* (2013.01); *B23K 9/20* (2013.01);
(Continued)

(58) Field of Classification Search
CPC ...... B23K 9/20; B23K 9/202; B23K 11/0053; B23K 11/002; B23K 20/1295;
(Continued)

(56) References Cited

U.S. PATENT DOCUMENTS 2,590,585 A * 3/1952 Temple .................. B21J 15/025
140/111
3,919,916 A * 11/1975 Alexander ............ B21J 15/025
411/29
(Continued)

FOREIGN PATENT DOCUMENTS

DE          10015713 A1   10/2001
DE     102005006253 A1    8/2006
(Continued)

OTHER PUBLICATIONS

English translation of the International Preliminary Report on Patentability for PCT/EP2013/060709 dated Dec. 11, 2014, 9 pages.
(Continued)

*Primary Examiner* — Dana Ross
*Assistant Examiner* — James F Sims, III
(74) *Attorney, Agent, or Firm* — Reising Ethington P.C.

(57) ABSTRACT

A welding auxiliary joining part in the shape of a stud having a head, a shank and a tip is disclosed. The welding auxiliary joining part is driven into a component made of a non- or poorly weldable material by means of a setting method. A welding head is created during driving-in due to mechanical deformation such that subsequently the component can be connected by welding via the welding auxiliary joining part to a further component made of a weldable material.

13 Claims, 11 Drawing Sheets

Figure 1:
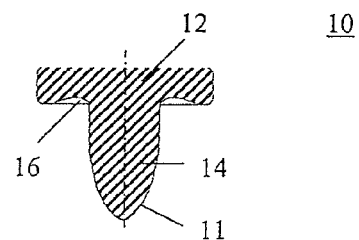

(51) Int. Cl.
- *B23K 20/02* (2006.01)
- *B23K 9/20* (2006.01)
- *B23K 20/12* (2006.01)
- *B23K 35/02* (2006.01)
- *F16B 5/08* (2006.01)
- *F16B 19/08* (2006.01)
- *F16B 5/04* (2006.01)

(52) U.S. Cl.
CPC .......... *B23K 20/02* (2013.01); *B23K 20/1295* (2013.01); *B23K 35/0288* (2013.01); *F16B 5/08* (2013.01); *F16B 19/086* (2013.01); *F16B 5/04* (2013.01)

(58) Field of Classification Search
CPC .. B23K 20/02; B23K 20/122; B23K 20/1255; B23K 35/0288; B23K 11/0046; B23K 11/0066; B21J 15/025; B21J 15/027; B21J 15/08; B29C 65/36; H05B 6/105; B21L 315/0085; B25C 1/005; B25C 5/025; B27F 7/02; F16B 5/04; F16B 5/08; F16B 19/086; B21B 15/0085
USPC ..... 219/91.23, 99, 117.1, 633, 634, 635, 98; 228/141.1, 112.1, 2.1; 227/120, 119, 149, 227/156; 29/432, 525.05, 525.06, 525.07
See application file for complete search history.

(56) References Cited

U.S. PATENT DOCUMENTS

| | | | |
|---|---|---|---|
| 5,739,498 A | 4/1998 | Sunamoto et al. | |
| 6,769,595 B2 | 8/2004 | Stol et al. | |
| 7,409,760 B2* | 8/2008 | Mauer | B21J 15/025 29/407.05 |
| 8,375,549 B2 | 2/2013 | Draht et al. | |
| 8,595,914 B2 | 12/2013 | Koppitz et al. | |
| 2002/0125297 A1* | 9/2002 | Stol | B21J 15/027 228/112.1 |
| 2003/0066864 A1* | 4/2003 | Delano | B23K 20/129 228/112.1 |
| 2008/0029581 A1* | 2/2008 | Kumagai | B23K 20/1255 228/101 |
| 2008/0067217 A1* | 3/2008 | Pinzl | B23K 20/129 228/114.5 |
| 2008/0222873 A1* | 9/2008 | Draht | F16B 19/14 29/432 |
| 2009/0294410 A1* | 12/2009 | Iwase | B21J 15/025 219/91.23 |
| 2010/0083481 A1* | 4/2010 | Luo | B21J 15/025 29/432 |
| 2010/0287752 A1* | 11/2010 | Wojciechowski | B21J 15/025 29/243.53 |
| 2011/0097142 A1 | 4/2011 | Bassler et al. | |
| 2013/0000101 A1* | 1/2013 | Rintelmann | F16B 19/00 29/525.03 |

FOREIGN PATENT DOCUMENTS

| | | | |
|---|---|---|---|
| DE | 102006002238 A1 | 7/2007 | |
| DE | 102007036416 A1 | 2/2009 | |
| DE | 102004025492 A1 | 8/2009 | |
| DE | 102008031121 A1 | 11/2009 | |
| DE | 102009035338 A1 | 1/2011 | |
| JP | 2008215464 A * | 9/2008 | ............ B21J 15/025 |
| WO | WO02062518 A1 | 8/2002 | |

OTHER PUBLICATIONS

Written Opinion & International Search Report for PCT/EP2013/060709 dated Oct. 2, 2013, 12 pages.
Translation of International Search Report for PCT/EP2013/060709 dated Oct. 2, 2013, 2 pages.
CN Office Action for CN Application No. 201380028489.7 dated May 5, 2016 (6 pages).

* cited by examiner

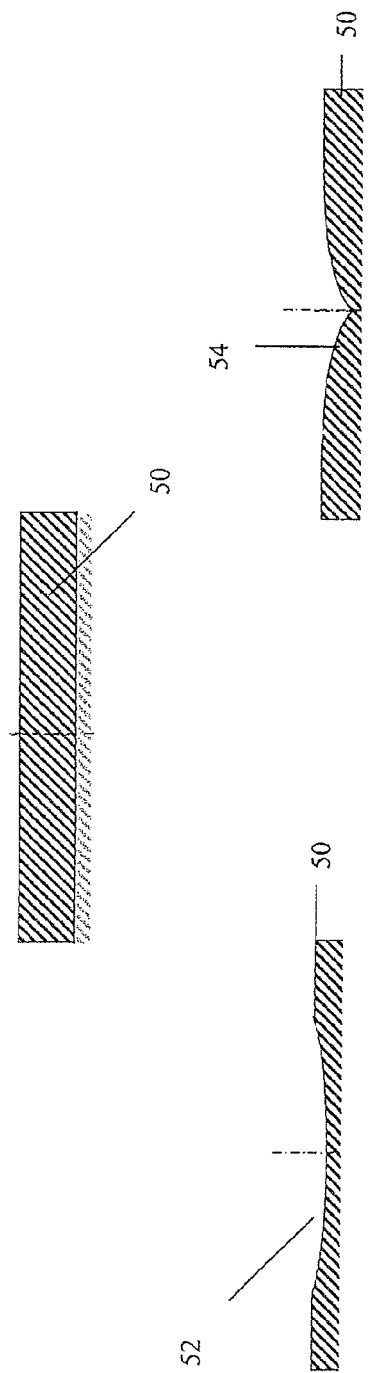

WELDING AUXILIARY JOINING PART WITH A PLASTICALLY DEFORMABLE TIP REGION; METHOD FOR CONNECTING COMPONENTS WITH THIS WELDING AUXILIARY JOINING PART

1. FIELD OF THE INVENTION

The present invention is related to a welding auxiliary joining part having the form or shape of a stud, to a method for connecting several components by means of this welding auxiliary joining part comprising a setting method for this welding auxiliary joining part into a component made of a non- or poorly weldable material and a welding method as well as at least a first component made of a non- or poorly weldable material and at least a second component made of a weldable material or a second component having a portion made of weldable material which have been connected to each other by means of the welding auxiliary joining part.

2. BACKGROUND OF THE INVENTION

Welding is a common method in order to connect components made of weldable material to each other, as for example components made of steel. Exemplary welding methods are resistance spot welding and stud welding, wherein two opposing components are connected to each other selectively or point by point by means of welding. A further welding method is the stud welding with electric arc.

In various industrial areas, components have to be connected to each other which partly consist of a non- or poorly weldable material. Nevertheless, welding is an effective connection method even for the components made of non- or poorly weldable material. For this purpose, a welding auxiliary joining part made of a weldable material is fastened into the component made of non- or poorly weldable material. Subsequently, a welding connection between a component made of weldable material and the welding auxiliary joining part is produced so that the component made of weldable material and the component made of a non- or poorly weldable material are connected to each other via the welding auxiliary joining part. Examples for components made of non- or poorly weldable material are sheets from aluminum, molded parts made of plastic or fiber-reinforced plastic as for example carbon-fiber-reinforced plastic, to name just a few examples. The above described method follows for example from the German patent application DE 100 15 713 A1.

A similar connection method by means of welding between a component made of non- or poorly weldable material and a component made of weldable material is described in the German patent application DE 10 2005 006 253 A1. In this document, a stud having a shank and a head made of weldable material is inserted into a pre-fabricated hole in the component made of non- or poorly weldable material and is subsequently welded to the component made of weldable material. To fix the stud with its shank in the pre-punched portion of the component made of non- or poorly weldable material reliably, the shank of the stud is laterally deformed after the welding by means of compressing so that a positive or frictional connection between the shank of the stud and the inner wall of the hole of the component results. Due to the plurality of method steps, the connection method described above is technically complex and time consuming.

In the German patent applications DE 10 2004 025 492 A1 and DE 10 2007 036 416 A1, rivets, studs or nails, respectively, are used as welding auxiliary joining part in components made of non- or poorly weldable material. The tip of the welding auxiliary joining part protrudes from the one side of the component made of non- or poorly weldable material and forms a weld spot with a very small contact surface for contacting the opposite component made of a weldable material. As soon as the welding auxiliary joining part and the component made of weldable material are connected to each other, for example by means of resistance welding in the manner of the resistance spot welding or the resistance stud welding, the tip or edge of the welding auxiliary joining part is melted so that a so-called weld nugget results. Due to the small contact surface between the welding auxiliary joining part and the component made of weldable material at the tip or in the cutting area of the welding auxiliary joining part, the contact area for welding is relatively small. This prolongs the welding process or degrades the weld connection due to the small contact surface compared to components arranged opposite to each other, which contact each other in a larger area. Corresponding to the small contact portion between the welding auxiliary joining part and the component made of weldable material, the formed weld nugget is small. This affects, among others, the mechanical load capacity as well as the lifetime of the produced connection. Further, when using a semi-hollow punch rivet as welding auxiliary joining part, a waste slug made of non- or poorly weldable material is created. During the subsequent welding, this slug is arranged in the welding area and in the area of the weld nugget so that the resulting weld connection is affected in its quality due to this contamination.

Further, in DE 10 2004 025 492 A1 it is seen as an advantage to mechanically deform the component made of weldable material in the contact area for the future welding by means of the setting procedure of the welding auxiliary joining part into the component made of non- or poorly weldable material. Especially, a tip or an edge of the welding auxiliary joining part enters the component made of weldable material or creates a recess in this component made of weldable material. This recess shall then facilitate or support the formation of a sufficiently large weld nugget during the resistance welding between the welding auxiliary joining part and the component made of weldable material in the area of this depression or recess, respectively. For realizing this method, however, it is necessary to arrange all components to be connected above each other before the welding auxiliary joining part is set. Otherwise, an additional amount of work is necessary to create the recess in the component made of weldable material and to align it with respect to the welding auxiliary joining parts already set. This is complex, time consuming and further requires additional installation effort for positioning the components to be connected to each other and is limited in the choice of the possible welding methods and the process orders.

It is therefore the object of the present invention to provide a less time consuming connection method between at least one component made of non-weldable material and at least one component made of weldable material compared to the prior art. It is further an object of the present invention to provide a welding auxiliary joining part for such a method which is easily producible, can be set with low effort and can be used flexibly.

3. SUMMARY OF THE INVENTION

The above-mentioned objects are solved by a welding auxiliary joining part in the shape of a stud according to claim 1, by means of the usage of a stud according to claim 10, by a setting method for a welding auxiliary joining part according to claim 11, by at least one component made of a non- or poorly weldable material having a welding auxiliary joining part set therein according to claim 19, a welding method for connecting at least a first component made of a non- or poorly weldable material and a welding auxiliary joining part set therein to a second component made of weldable material or a second component having at least a portion made of weldable material according to claim 20, by a connection method for at least one component made of non- or poorly weldable material to a component made of weldable material or to a component having at least a portion made of weldable material by means of a combination of a setting method and a welding method according to claim 23 and by means of at least a first component made of non- or poorly weldable material and at least a second component made of weldable material or at least a second component having a portion made of weldable material which are connected to each other via a welding auxiliary joining part set therein according to claim 24. Advantageous embodiments and developments of the present invention result from the description, the accompanying drawings as well as the dependent claims.

The present invention discloses a welding auxiliary joining part in the form or shape of a stud for joining into at least one component and producing a welding connection from a plurality of components, preferably with at least one component made of non- or poorly weldable material. The inventive welding auxiliary joining part has the following features: a head, a tip portion extending in longitudinal direction of the welding auxiliary joining part and having a maximum thickness transversely to the longitudinal direction, and preferably a shank, wherein the stud consists of a weldable material that is plastically deformable during a setting method of the welding auxiliary joining part.

The inventive welding auxiliary joining part is formed in the shape of a stud made of weldable material, as for example steel having a carbon equivalent of 0.2 to 0.8, preferably of 0.3 to 0.6. The Carbon Equivalent Value (CEV) is in materials science a measure for the judgment or evaluation of the welding suitability of unalloyed or lowly alloyed steels. The carbon content and a plurality of other alloy elements in the steel influence its behavior. For evaluating the welding suitability, the carbon content and the weighted part of the elements influencing the welding suitability of the steel in a similar way as it would be expected from carbon are therefore summarized in the carbon equivalent to a numeric value. Preferably, the welding auxiliary joining part is suitable for setting by means of a high speed joining method or for a setting method in general, wherein the welding auxiliary joining part is settable into the at least one component made of non- or poorly weldable material by means of only one impulse. Similarly, it is also preferred to set the welding auxiliary joining part by means of common setting methods as they are used for example for semi-hollow punch rivets. For the different setting methods, it has proven especially advantageous to form the stud without shank. The stud comprises a tip portion extending into the longitudinal direction of the welding auxiliary joining part. The tip portion comprises a maximum thickness adjacent to a head or adjacent to a shank of the welding auxiliary joining part. At its end facing away from the head, the tip portion comprises a tip to which the tip portion tapers continuously or stepwise.

According to an embodiment, the welding auxiliary joining part comprises an ogival tip having an ogivality factor of 1 to 10, preferably of 3 to 5, which is suitable for the impulse-like high speed joining. Based on this shaping, an advantageous material displacement in the component made of non- or poorly weldable material takes place in radial direction relative to the shank of the stud and in the area of the tip of the shank. A further advantage is that the welding auxiliary joining part can be deformed mechanically in its tip portion due to this shape so that a welding head or weld spot is formed, which is advantageous for the future welding of the welding auxiliary joining part. The welding head provides a reliable contact surface for resistance welding or arc welding at the welding auxiliary joining part. Therefore, also a weld spot being present only as surface is generally referred to and understood as welding head. An adaption to different material thicknesses of the at least one component made of non- or poorly weldable material preferably takes place via a respective adjustment of the length of the shank or the tip portion of the welding auxiliary joining part while maintaining a consistent tip geometry.

According to different preferred embodiments of the welding auxiliary joining part according to the invention, the head is larger or equal in its diameter as compared to a diameter of the shank or a maximum thickness of the tip portion of the welding auxiliary joining part. In case the head diameter is larger than the diameter of the shank or the maximum thickness of the tip portion, an annular groove is formed preferably at the side of the head facing the shank for receiving a material deformation of a component adjacent to the head. In the same manner, it is preferred to form grooves or ribs extending in radial direction instead of the annular groove or in combination with the annular groove to provide receiving spaces for receiving a material deformation of a component adjacent to the head.

To provide furthermore a reliable connection between the welding auxiliary joining part and a component made of non- or poorly weldable material, the shank of the welding auxiliary joining part is formed cylindrically, cylindrical-like or at least partly conically. Cylindrical-like includes also a polygonal cross-sectional shape of the welding auxiliary joining part. According to a further preferred embodiment, an outer knurling or profiling of the shank of the welding auxiliary joining part supports the connection to the component made of non- or poorly weldable material into which the welding auxiliary joining part has been set without pre-punching.

Furthermore, it is preferred to form the tip portion of the welding auxiliary joining part with or without shank with a conical or a pyramid-shaped tip. In this context, it has proved to be advantageous if the side surfaces of the tip include an angle with the longitudinal axis of the welding auxiliary joining part in the range of 5° to 60°, preferably of 15° to 40° and more preferably of 20° to 30°.

The present invention discloses also the usage of the above described stud with its preferred embodiments as welding auxiliary joining part.

The present invention also includes a setting method for a welding auxiliary joining part, especially the above described welding auxiliary joining part in its different preferred embodiments, into at least one component made of non- or poorly weldable material without pre-punching of the at least one component. The setting method according to the invention comprises the following steps: setting the welding auxiliary joining part into the at least one component, wherein no waste material, especially no setting slug, is separated from the at least one component, and mechanically deforming the welding auxiliary joining part at an exit location of the welding auxiliary joining part from the at least one component during the setting so that a tip portion of the welding auxiliary joining part is at least partly deformed into a welding head or weld spot. According to a preferred embodiment of the setting method, the welding auxiliary joining part is set by means of an impulse-like force that accelerates the welding auxiliary joining part to a speed of at least 5 m/s. Preferably, the welding auxiliary joining part is set by means of the high-speed joining or the impulse-speed joining, wherein it is accelerated to speeds or velocities in the range of 5 m/s to 50 m/s, especially of 10 m/s to 45 m/s. It is also preferred to accelerate the welding auxiliary joining part to a speed of at least 10 m/s, further preferred to at least 20 m/s, even more preferred to at least 30 m/s and also preferred to at least 40 m/s. Further, the welding auxiliary joining part is preferably set into one or a plurality of components, the total thickness of which is at one or more layers in the range of 0.5 mm to 10 mm, preferably of 0.5 mm to 8 mm and further preferred of 0.5 to 5 mm. Preferably, a length of the welding auxiliary joining element is adapted to this total thickness to achieve an ideal functionality.

The setting method of the welding auxiliary joining part according to the invention serves the preparation of the future connection of the at least one component made of non- or poorly weldable material with at least one further component made of weldable material or generally a supporting component by means of welding. If the supporting component or, in general, the at least one further component does not consist of weldable material, it is preferred to provide in this at least one further component or supporting component at least a portion made of weldable material. This portion made of weldable material preferably consists of a welding auxiliary joining part according to the above description or as known in the prior art.

As part of the setting method, a weldable welding auxiliary joining part is fastened in the non- or poorly weldable material. This welding auxiliary joining part has preferably the shape of a stud, as described above. This stud or the welding auxiliary joining part, respectively, is preferably set by means of a high speed setting method into the at least one component made of non- or poorly weldable material, wherein, alternatively, also other known methods for setting a joining element are applicable. During the high speed setting method, the welding auxiliary joining part is accelerated to a velocity of at least 5 m/s before it enters the non-pre-punched component. In the above-mentioned setting method, the welding auxiliary joining part is accelerated preferably by means of hydraulically, electromagnetically, mechanically or compressed-air powered drive means. A further alternative is to inject the welding auxiliary joining part into the component by means of a gas charge to be ignited.

Based on the shape of the welding auxiliary joining part, preferably in the shape of a stud with the above-described features, no waste material is produced during the setting process. This simplifies the entire setting method as this waste material does not interfere with the further setting method and has also not to be removed from the joining area. Furthermore, also no waste material is present in the future welding area and affects the welding connection to be produced.

In preparation of the subsequent welding method, the welding auxiliary joining part is mechanically plastically deformed during the setting method in its tip portion such that a welding head or weld spot is formed. By means of this welding head/weld spot, a component made of weldable material or a portion of a component made of weldable material is contacted during a future welding method. By means of this, the welding head and the component made of weldable material or the welding head and the portion made of weldable material of the component may form a weld nugget, for example by means of a resistance welding method. Preferably, this mechanical deforming of the tip portion of the welding auxiliary joining part with or without shank takes place by compressing the welding auxiliary joining part at an anvil or a component of high strength, preferably weldable, material being arranged at the exit location of the welding auxiliary joining part out of the at least one component made of non- or poorly weldable material. By means of preferred anvil arrangements, the shape and the radial or lateral extension of the welding head can be influenced to be able to optimize the subsequent welding method. In this way, the welding head forms a larger contact surface for welding as it would be provided by a tip or an edge of a known welding auxiliary joining part set according to known setting methods. In this context, it is preferred to compress the welding auxiliary joining part at a flat anvil or an anvil having a depression-like surface contour. The depression-like surface contour forms a recess within the anvil in setting direction of the welding auxiliary joining part. Depending on the desired size and shape of the welding head, the depression is formed with different depths and/or has angular or rounded edges. Further, it is preferred to provide a recess within the depression or on the flat anvil which is arranged in extension of the longitudinal axis of the welding auxiliary joining part. This recess is preferably smaller in its cross-section than the half of the maximum thickness of the tip portion, further preferred less than ⅓ of the maximum thickness of the tip portion. If the welding auxiliary joining part is deformed plastically in this recess during the setting procedure, a pin-like extension or a contact tip is created at the welding head or the weld spot. This pin-like extension or the contact tip is preferably usable for a stud welding with arc as, based on the corresponding electrical parameters, the extension or the contact tip melts during arc welding and facilitates the ignition of the arc.

According to a further preferred embodiment of the present invention, a nail having a head and preferably with or without a shank is used as welding auxiliary joining part. A head diameter of the nail is larger than a shank diameter or a maximum thickness of a tip portion of the nail so that after completion of the setting procedure, the head underside facing the component abuts the at least one component or is arranged spaced therefrom. As far as the head diameter of the nail does not exceed the shank diameter or the maximum thickness of the tip portion, it is further preferred that upon completion of the setting method, the head of the nail is arranged flush with the at least one component or protrudes therefrom. Due to these different arrangement alternatives for the head of the welding auxiliary joining part, whether smaller or larger in diameter relative to the shank diameter, additional connection points for further components can be provided. There exists also the possibility to produce advantageous connection configurations between the component made of non- or poorly weldable material and the at least one component made of weldable material or the at least one component having at least a portion made of weldable material based on the material displacement during the subsequent welding method.

It is further preferred that the welding head of the welding auxiliary joining part created by mechanical deformation is arranged flush with one side of the at least one component or protrudes from the side of the at least one component having the exit location of the welding auxiliary joining part.

This arrangement of the mechanically deformed end of the welding auxiliary joining part ensures that a weld spot or a sufficiently large weldable area for contacting the at least one second component consisting of weldable material is present for a future reliable welding connection. Furthermore, it is possible to preset a specific distance of the components to be connected to each other by means of the adjustment of a protrusion of the mechanically deformed end of the welding auxiliary joining part at the side having the exit location of the welding auxiliary joining part. A further alternative method is that the protruding material of the welding auxiliary joining part at the side of the head and/or the deformed shank tip is melted during the welding for forming a sufficiently large weld nugget and thus a reliable connection.

The present invention also comprises at least one component made of non- or poorly weldable material with a welding auxiliary joining part set therein, the tip portion of which has been mechanically plastically deformed by a setting method into a welding head, especially a component into which a welding auxiliary joining part has been set with a setting method according to the above described alternatives.

Moreover, the present invention discloses a welding method for connecting at least a first component made of non- or poorly weldable material having a welding auxiliary joining part set therein with a mechanically deformed tip portion of the welding auxiliary joining part, especially produced with the above described setting method, and at least a second component made of weldable material or at least a second component having at least a portion made of weldable material. The at least one second component is for example a supporting component made of steel or of another weldable metal. A further alternative provides a second component or supporting component of non-weldable material like plastic or CFRP (carbon fiber reinforced plastic). To be able to weld this, at least a portion of a weldable material is provided, preferably consisting of a known or a preferred welding auxiliary joining part according to the invention.

The welding method according to the invention comprises the following steps: the welding auxiliary joining part set in the first component is brought at a welding head into contact with the second component made of weldable material or with a portion made of weldable material of the second component or supporting part and the first and the second component are welded to each other via the welding auxiliary joining part in the first component. The welding is carried out by selective heat generation in the contact area of the welding head of the welding auxiliary joining part and the second component consisting of weldable material. According to the other alternative, the at least one second component consists of non-weldable material and preferably comprises a welding auxiliary joining part. In case the welding head of the welding auxiliary joining part in the first component is now brought into contact with the one or the other axial end of the welding auxiliary joining part in the second component, the first and the second component are welded to each other via the welding auxiliary joining parts. The heat required therefor is for example created by a known resistance welding method, by inductive heating of the welding area, by ultrasonic excitation of the joining partners or by other known welding methods. Due to this specific heat input between welding head and the component consisting of weldable material or the component with welding auxiliary joining part, the contacting material will be melted so that a weld nugget is formed. After cooling of this weld nugget, it forms the connection between the welding auxiliary joining part of the first component and the second component made of weldable material or with the welding auxiliary joining part in the second component in this area. Thus, the second component made of weldable material is connected to the first component made of non- or poorly weldable material indirectly via the welding auxiliary joining part.

It is also preferred to use at least one of the above described preferred embodiments of the welding auxiliary joining part according to the present invention in the at least first component, and further preferred also in the at least one second component.

Further, the present invention comprises a connection method for at least one component made of non- or poorly weldable material with a component made of weldable material or with a component comprising at least a portion made of weldable material by means of a combination of the above described setting method and the above described welding method.

Further, the above described invention comprises at least a first component made of non- or poorly weldable material and at least a second component made of weldable material or at least a second component having at least a portion made of weldable material, especially a vehicle, which have been connected to each other by means of welding via a weldable welding auxiliary joining part set in the at least first component, preferably by means of high-speed joining, having a welding head created due to mechanical deformation, especially by means of the above described connection method consisting of the discussed setting method and the discussed welding method.

4. SHORT DESCRIPTION OF THE ACCOMPANYING DRAWINGS

Figure 2:
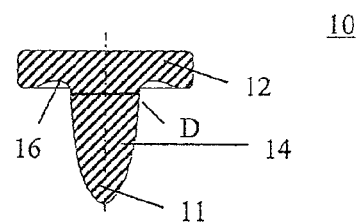
Figure 3:
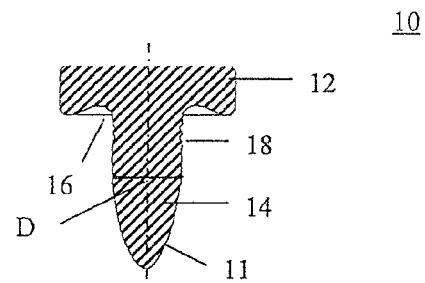
Figure 4:
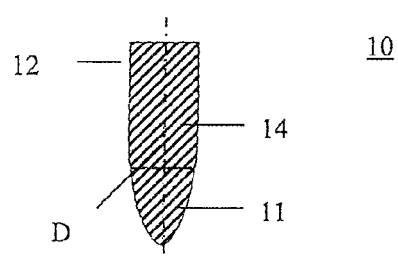
Figure 5:
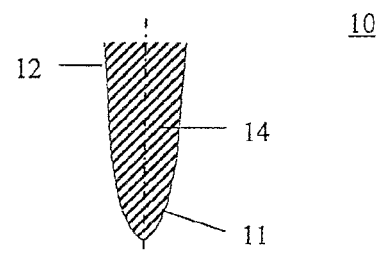
Figure 13:
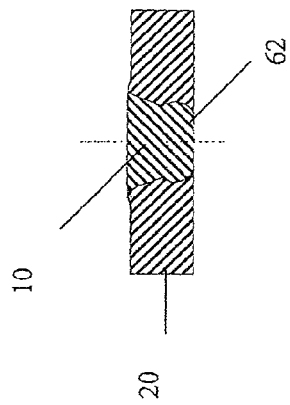
Figure 12:
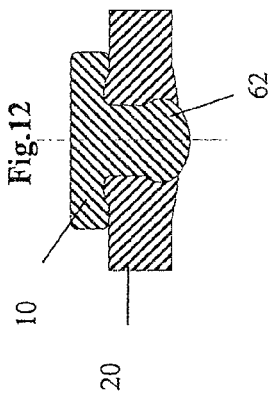
Figure 14:
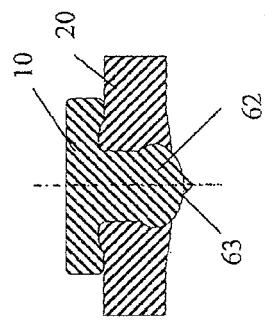
Figure 11:
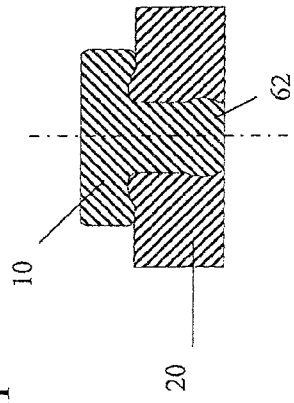
Figure 19:
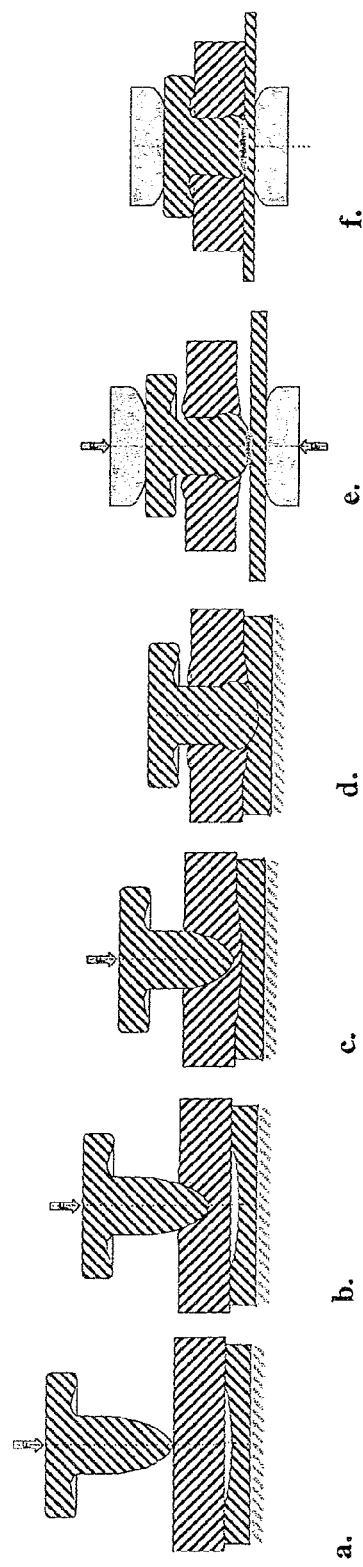
Figure 21:
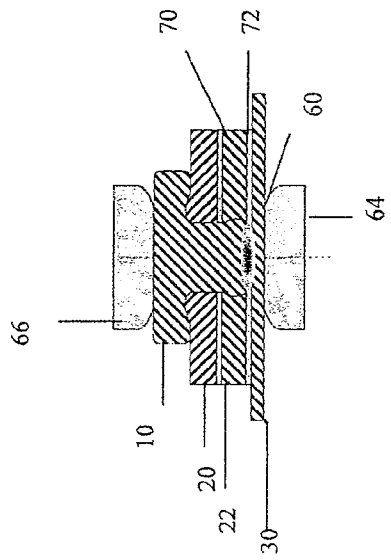
Figure 20:
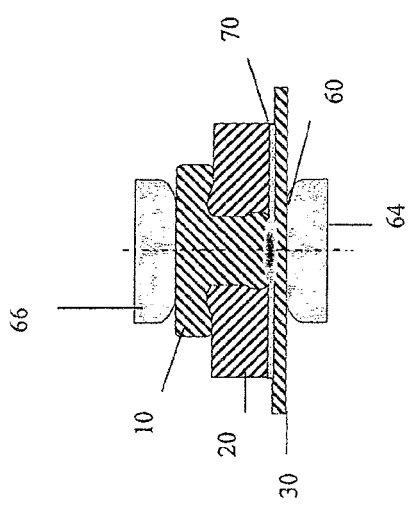
Figure 22:
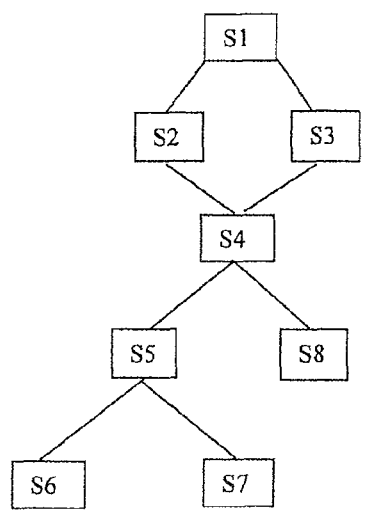
Figure 23:
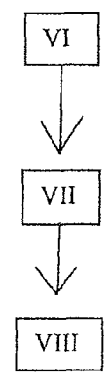
Figure 24:
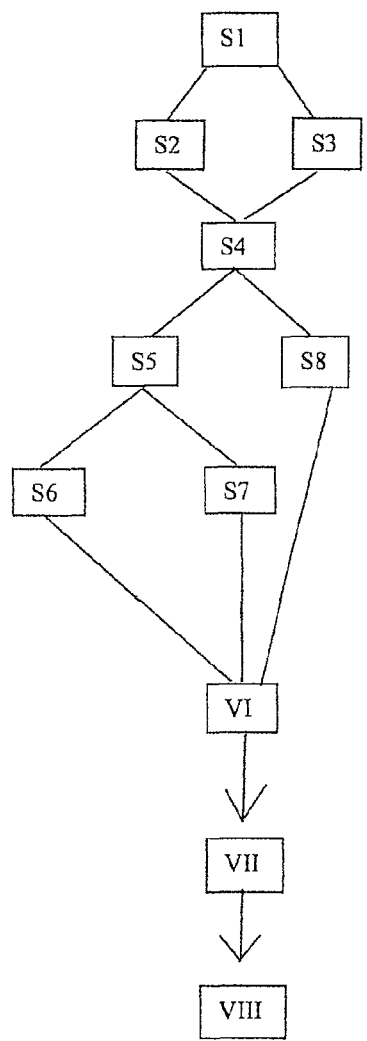

The present invention is described with reference to the accompanying drawings in more detail. It shows:

FIG. 1 a preferred embodiment of the welding auxiliary joining part of the present invention, FIG. 2 a further preferred embodiment of the welding auxiliary joining part of the present invention, FIG. 3 a further preferred embodiment of the welding auxiliary joining part of the present invention, FIG. 4 a further preferred embodiment of the welding auxiliary joining part of the present invention, FIG. 5 a further preferred embodiment of the welding auxiliary joining part of the present invention, FIG. 6 a schematic sectional view of a preferred anvil for setting the welding auxiliary joining part of the present invention, FIG. 7 a preferred embodiment of the anvil for setting the welding auxiliary joining part, FIG. 8 a further preferred embodiment of the anvil for setting the welding auxiliary joining part, FIG. 9 a further preferred embodiment of the anvil for setting the welding auxiliary joining part, FIG. 10 a further preferred embodiment of the anvil for setting the welding auxiliary joining part, FIG. 11 a preferred embodiment of a welding auxiliary joining part of the present invention which has been set into a component made of non- or poorly weldable material, FIG. 12 a further preferred embodiment of a welding auxiliary joining part which has been set into a component made of non- or poorly weldable material, FIG. 13 a further preferred embodiment of a welding auxiliary joining part which has been set into a component made of non- or poorly weldable material, FIG. 14 a further preferred embodiment of a welding auxiliary joining part which has been set into a component made of non- or poorly weldable material, FIG. 15a-e a schematic depiction of a preferred embodiment of a setting and a subsequent welding of two components by means of the preferred welding auxiliary joining part, FIG. 16a-e a schematic depiction of a further setting method of a preferred welding auxiliary joining part into two components made of non- or poorly weldable material and a subsequent welding of this compound with a component made of weldable material via the welding auxiliary joining part, FIG. 17a-e a schematic depiction of a further preferred embodiment of the setting method of the welding auxiliary joining part and the subsequent welding method of the set welding auxiliary joining part of the present invention, FIG. 18a-e a schematic depiction of a further preferred embodiment of a setting, method of a preferred welding auxiliary joining part and a subsequent welding method based on the set welding auxiliary joining part, FIG. 19a-f a schematic depiction of a further preferred embodiment of the setting method of a preferred welding auxiliary joining part and a subsequent welding method based on the set welding auxiliary joining part, FIG. 20 a schematic depiction of a welding method for a set welding auxiliary joining part preferred according to the invention with two components and an adhesive layer arranged there between, FIG. 21 a schematic depiction of a preferred welding method of several components and a preferred welding auxiliary joining part according to the invention set therein, wherein an adhesive layer is arranged between each of the components, FIG. 22 a flow chart of a preferred setting method of the welding auxiliary joining part, FIG. 23 a flow chart of a preferred welding method of the welding auxiliary joining part and FIG. 24 a flow chart for a preferred connection method of at least one component made of non- or poorly weldable material and at least a component made of weldable material by means of a welding auxiliary joining part preferred according to the invention comprising the process sections setting of the welding auxiliary joining part and welding of the welding auxiliary joining part.

5. DETAILED DESCRIPTION OF THE PREFERRED EMBODIMENTS

The present invention is related to producing a reliable connection with a long lifetime between at least one component 20 made of non- or poorly weldable material and at least one component 30 made of weldable material by means of welding (cf. FIGS. 15 to 21). The materials of the components 20 and 30 to be connected are not welding-compatible to each other so that they are welded indirectly to each other via a preferred welding auxiliary joining part 10 according to the invention. The weldable materials include steels and high strength steels such as for example 22MnB5 (CEV=0.5), B27 (CEV=0.54), 32MnCrB6 (CEV=0.6), from which, among other things, frame structures in the vehicle construction are manufactured. The non- or poorly weldable materials are materials which cannot or only poorly be welded to other components without constructive aids. This comprises also weldable materials which have no or only a poor welding compatibility with respect to their material combination with the material of a component to be connected thereto. This means that generally weldable materials cannot or can only poorly or with difficulties be welded to each other. These materials include for example plastics, fiber reinforced plastics, aluminum, cast iron or other cast alloys as well as steels, as for example spring steels with a CEV>0.8.

To be able to connect the at least one component 20 made of non- or poorly weldable material by means of welding, it is provided with the welding auxiliary joining part 10. This welding auxiliary joining part 10 consists of weldable material and is anchored in the at least one component 20. Due to its material, the welding auxiliary joining part 10 is subsequently connectable with the at least one component 30 made of weldable material by means of welding. In this way, a reliable connection between the components 20, 30 is created by means of the welding auxiliary joining part 10.

It is also preferred to provide the at least one component 30 made of non-weldable material. In this case, the at least one component 30 comprises at least one portion made of weldable material which is preferably formed by a known welding auxiliary joining part or a preferred welding auxiliary joining part 10 according to the invention (not shown). For producing a connection between the at least one component 20 and the at least one component 30, preferably the welding auxiliary joining parts provided in each of the two components 20, 30 are welded to each other, preferably by means of resistance welding or arc welding. This welding of the two welding auxiliary joining parts, and thus the two components 20, 30, takes place such that the welding heads or heads of the two welding auxiliary joining parts are brought into contact with each other and are then welded. Alternatively, a head of a welding auxiliary joining part is brought into contact with the welding head of the other welding auxiliary joining part and then they are welded to each other.

Preferred embodiments of the welding auxiliary joining part 10 according to the invention are shown in FIGS. 1 to 5. The welding auxiliary joining part 10 comprises a head 12 and preferably a shank 14. Further, the welding auxiliary joining part 10 comprises a tip portion 11 extending in the longitudinal direction of the welding auxiliary joining part 10. The tip portion extends between a tip of the welding auxiliary joining part 10 and a point at which the tip portion reaches its maximum thickness D (cf. FIGS. 2 to 4).

The tip portion 11 has different shapes according to different embodiments of the present invention. In a side view, the tip portion is conical or pyramid-shaped or parabolic. Further, it is preferred to form the lateral surface symmetrical to the longitudinal axis of the tip portion in a convex or concave or polygonal way. It should be understood that the above described embodiments of the tip portion 11 are usable in combination with the head 12 or in combination with the head 12 and the shank 14.

The head 12 of the welding auxiliary joining part 10 has a head diameter which is either greater than or equal to the diameter of the shank 14 or to the maximum thickness D of the tip portion 11. According to the embodiments shown in FIGS. 1 and 2, the head diameter is greater than the shank diameter or the maximum thickness D. After the welding auxiliary joining part 10 has been set into the at least one component 20 made of non- or poorly weldable material, the underside of the head 12 facing the shank 14 or the tip portion 11 abuts the component 20 or is arranged spaced therefrom. This means that the welding auxiliary joining part 10 has been set with a certain head projection into the at least one component 20. The head underside of the head 12 preferably comprises a ring-shaped under-head-groove around the shank or the tip portion 11. This under-head-groove 16 is provided for material receiving or material accommodation of displaced material from the at least one component 20 arranged adjacent to the head 12.

Also preferred, the head underside of the head 12 comprises additionally to or instead of the under-head-groove 16 ribs and/or recesses or grooves extending in radial direction. The recesses or grooves (not shown) and the ribs (not shown) define cavities in which displaced material of the component 20 is receivable. These cavities provide optimal support of the head 12 on the component 20 despite the material displacement of the component 20. Further, these cavities form an undercut against a rotation of the welding auxiliary joining part in the at least one component 20.

According to further preferred embodiments of the welding auxiliary joining part 10 according to the invention, the head diameter of the head 12 is equal to the shank diameter 14 or to the maximum thickness D of the tip portion, as it is exemplarily shown in FIGS. 4 and 5.

For the different embodiments of the welding auxiliary joining part 10 it is also preferred to provide the shank 14 cylindrically (cf. FIG. 1, 3, 4), cone-shaped (cf. FIGS. 2 and 5) as well as with or without outer knurling 18 (cf. FIG. 3).

According to a further preferred embodiment of the present invention, a tip of the shank 14 preferably has an ogival shape with an ogivality factor in the range of 1 to 20, further preferred with an ogivality factor in the range of 3 to 5. It is also preferred that the tip has a parabolic shape or is cone-shaped or pyramidal in its longitudinal sectional view. According to a further preferred embodiment, the lateral or surface area of the tip portion 11 encloses with the longitudinal axis of the welding auxiliary joining part 10 an angle in the range of 5° to 60°.

The above described welding auxiliary joining part 10 is used for connecting the at least one component 20 made of non- or poorly weldable material to the at least one component 30 made of weldable material. Alternatively, it is also preferred to provide the at least one component 30 made of non-weldable material with a welding auxiliary joining part so that the at least one component 20 and the at least one component 30 can be connected via their welding auxiliary joining parts to each other.

This connection method is composed of a setting method and a welding method being performable locally and timely separated from each other or in a sequence at one place. The setting method comprises the setting or driving (S1) of the welding auxiliary joining part 10 into the at least one first component 20, wherein the at least one first component 20 is not pre-punched. The welding auxiliary joining part 10 is driven into the at least one first component 20 such that no waste material as for example a punch or waste slug or similar is produced. This prevents the fact that the waste material has to be removed. Further, the waste material is thus prevented from being accumulated at or adjacent a weld spot or welding head and thus negatively affecting the welding with respect to the welding connection to be produced.

During the driving-in (S1), the joining energy supplied to the welding auxiliary joining part 10 is adjustable such that the welding auxiliary joining part with (S3, FIG. 14) or without protruding head (S3, FIG. 15, 16, 18) can be driven in. The driving-in with and without head protrusion is applicable for the welding auxiliary joining part 10 with and without head in the same way. The head protrusion ensures that preferably during the future welding (see below) the supply of additional material to the welding location is ensured.

The FIGS. 15 to 19 schematically illustrate the preferred driving (S1) of the welding auxiliary joining part 10 into one or more components 20, 22 made of non- or poorly weldable material. During the driving-in of the welding auxiliary joining part 10, the at least one first component 20, 22 is supported at a stable surface providing the corresponding counterforce for the driving-in. This stable surface is formed by an anvil 50 or the at least one second component 30, which in this case consists of a material having a higher strength than the welding auxiliary joining component 10. In this manner, it is ensured that the second component 30 is not deformed during the setting procedure.

Due to this stable or non-deformable surface formed by the anvil 50 or the at least one second component 30, the welding auxiliary joining part 10 is deformed at an exit location of the welding auxiliary joining part 10 out of the at least one first component 20; 22 (S4). During the deformation, the tip of the welding auxiliary joining part 10 is deformed into a welding head 62 which provides a future contact surface, which is advantageous during welding. It is thus preferred to compress the welding auxiliary joining part 10 at the anvil 50 (S8) or at the at least one second component 30 (S5) and to deform it plastically thereby.

Since the anvil 50 or the at least one second component is preferably arranged flush at the at least one first component 20; 22, a welding head 62 is produced by means of this compression which is arranged flush with the anvil 50 (S6) or which is arranged flush with the side of the first component 20, 22 facing the second component 30 (cf. FIG. 11, 30). It is also preferred to drive-in the welding auxiliary joining part 10 such that the welding head 62 created by mechanically plastically deformation protrudes at the side of the at least one first component 20; 22 facing away from the head 12, as it is shown in the preferred embodiment in FIG. 12. In this manner, additional material of the welding auxiliary joining part 10 is provided for the future welding, which would not be present in case of a flush arrangement of the setting head 62. The additional material of the protruding welding head 62 or of the protruding head 12 (see above) is pressed preferably during the welding into the welding area and especially into the weld nugget 60 (see below) so that there is additional material available for producing a reliable welding connection.

The welding head 62 with protrusion or with non-flush arrangement is preferably also created by driving-in the welding auxiliary joining part 10 against an anvil 50 having a depression-like recess 52, 54 in drive-in direction. Preferred embodiments of such an anvil 50 are shown in FIGS. 7, 8, 9 and 10.

In FIG. 7, a flat depression 52 can be seen while according to FIG. 8 a depression 54 with small width and larger depth is used when viewed in the cross-section of the anvil 50. The anvil 50 in FIG. 9 comprises a rectangular recess arranged in setting direction of the welding auxiliary joining part 10 with rounded edge portions when viewed in the cross-section of the anvil 50. The preferred anvil 50 according to FIG. 10 comprises an oval recess in drive-in direction. Furthermore, a further recess 56 is provided centrally within the recess 52 of the anvil 50 in FIG. 10. This recess 56 is preferably tapered. During the setting of the welding auxiliary joining part 10 into the at least one component 20; 22 and against the anvil 50 according to FIG. 10, the tip portion 11 of the welding auxiliary joining part 10 deforms into the recess 52 and the recess 56 of the anvil 50. By the plastical deformation of the welding auxiliary joining part 10 into the recess 56, an advantageous geometric tip shape 63 is created at the welding head 62 for the arc welding. FIG. 14 shows a respective set welding auxiliary joining part 10. In FIG. 14, the geometric tip shape 63 at the welding head 62 is clearly visible. Upon application of known electrical parameters at the future welding, an electric arc occurs at this geometric tip shape 63 so that the component 20 is weldable directly or via an auxiliary joining part introduced therein to the component 30 via stud-arc welding.

Figure 15:
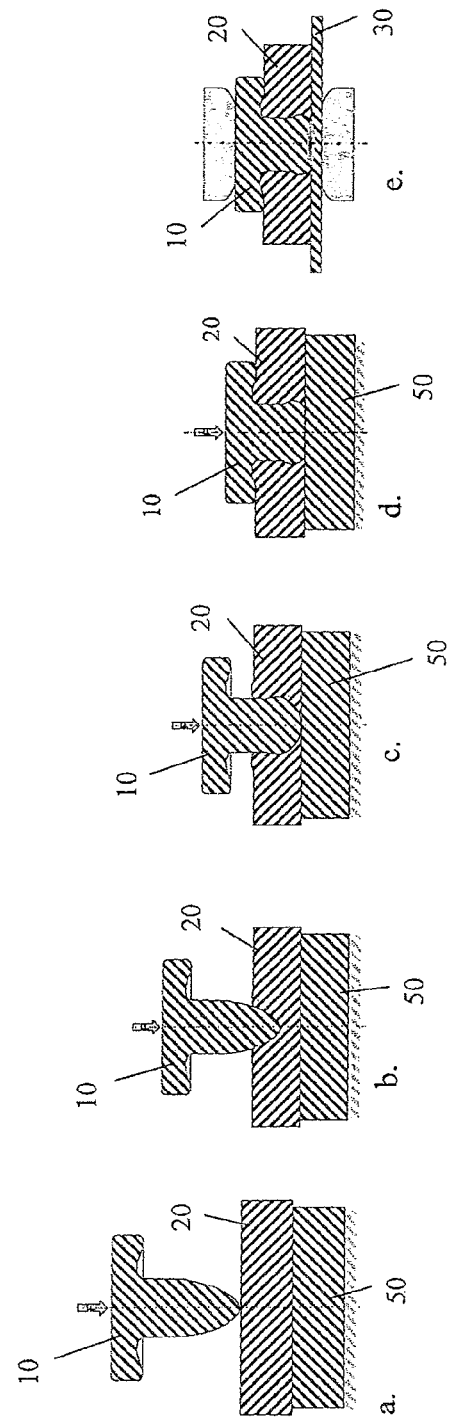
Figure 16:
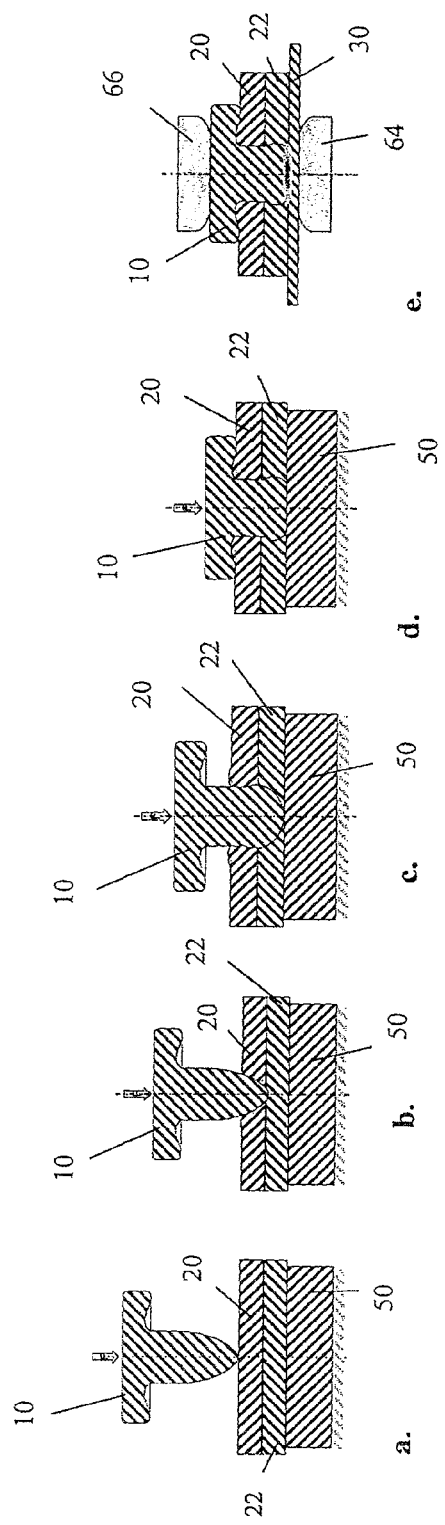
Figure 17:
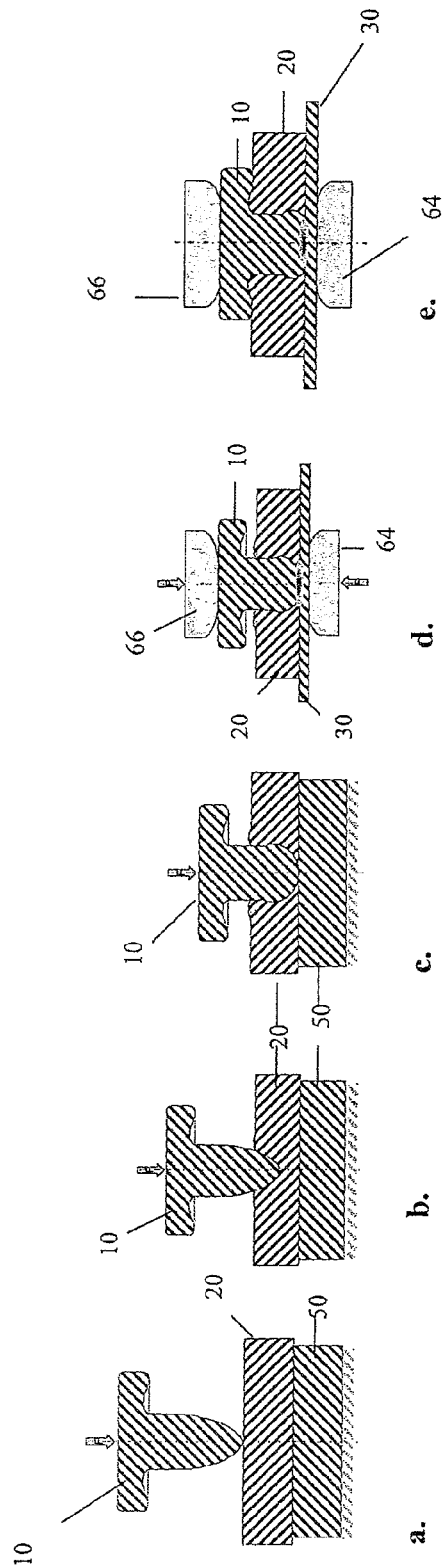
Figure 18:
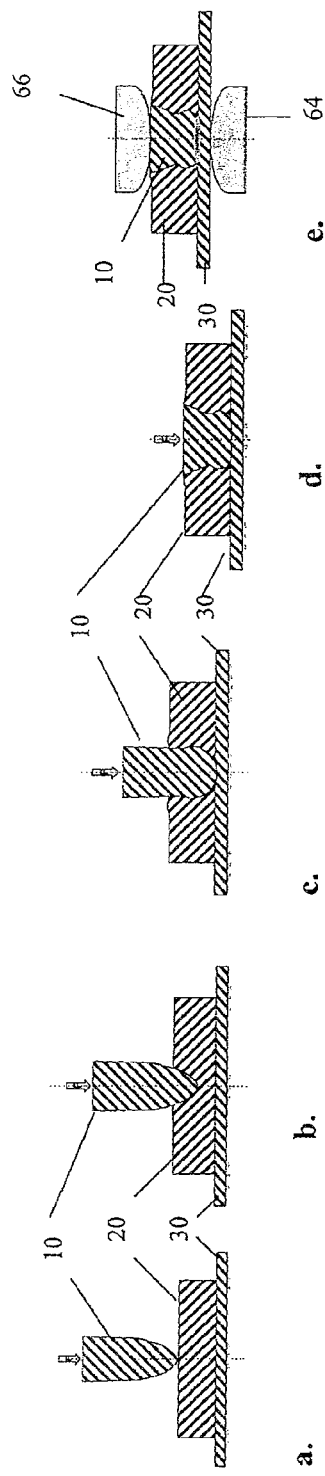

As can be seen with reference to FIGS. 15 to 17, during the deforming (S4) of the welding auxiliary joining part 10, the material of the welding auxiliary part 10 is pressed in radial direction with respect to the shank 14 as the anvil 50 or the second component 30 restricts or prevents an axial material displacement in drive-in direction. Due to this radial material displacement and the formation of the welding head 62, a positive locking between the at least one component 20; 22 and the welding auxiliary joining part 10 occurs, as shown in FIGS. 11 to 13. Preferably, the head 12 and the setting head 62 namely form an axial undercut which supports the connection between the welding auxiliary joining part 10 and the at least one component 20; 22. Further, the radial material displacement ensures that there is almost no material of the component 20; 22 at the welding head 62 so that the welding head 62 provides a clean contact surface for welding.

The driving-in (S1) of the welding auxiliary joining part 10 is performed by a punch (not shown) which is moved by a hydraulically, electromagnetically, electrically, pneumatically or gas powered drive. According to a preferred embodiment of the present invention, the welding auxiliary joining part 10 is driven-in by means of an impulse-like force which accelerates the welding auxiliary joining part 10 up to a speed of at least 5 m/s, preferably at least 10 m/s and even more preferred of at least 20 m/s. Such a driving-in or setting method is described in DE 10 2006 002 238, to which it is referred to here. Further, the above-mentioned speeds of the welding auxiliary joining part 10 are preferred.

After completion of the setting method, the at least one component 20; 22 made of non- or poorly weldable material with a welding auxiliary joining part 10 is present which provides a welding head 62 which is arranged flush or protruding. Further, the head 12 protrudes from the component 20; 22 or abuts the component 20; 22. As the at least one first component 20; 22 and the welding auxiliary joining part are connected to each other in a reliable manner, it is preferred to transport this composite or compound and to weld it elsewhere. In the same manner, the following welding method may be performed in place subsequently to the setting method.

For welding the compound of the at least one component 20; 22 and the welding auxiliary joining part 10 to the at least one component 30, a welding electrode 64, 66 is applied to each of the head 12 of the welding auxiliary joining part 10 and the at least one second component 30 (cf. FIGS. 15 to 18d, e, 20, 21). Prior to this, the welding auxiliary joining part 10 arranged in the component 20, 22 and the at least one component 30 are arranged such that they are in contact with each other (VI). In case the second component 30 consists or is made of a non-weldable material, a portion made of weldable material in the component 30, preferably a welding auxiliary joining part, is brought into contact with the welding auxiliary joining part 10 in component 20. As the welding auxiliary joining part 10 and the at least one second component 30 or both welding auxiliary joining parts are electrically conductive, the welding electrodes 64, 66 create a current-flow between the welding electrodes 64, 66 (VII). At the same time, the welding electrodes 64, 66 are preferably pressed against each other with a defined force and thus pressed against the welding auxiliary joining part 10 and the at least one second component 30. By means of the current flow, heat is created so that a weld nugget 60 is formed at the welding head 62. In the area of the weld nugget 60, the material of the welding auxiliary joining part 10 and the second component 30 is melted. Depending on the pressure force of the welding electrodes 64, 66, the protruding material of the welding auxiliary joining part 10 is pressed in the welding area with the weld nugget 60 in case of a head protrusion (cf. FIG. 17d) or in case of a protrusion of the welding head 62 (cf. FIG. 12). In this way, the additionally supplied material of the welding auxiliary joining part 10 serves for producing the welding connection. After sufficient welding, the current through the welding electrodes 64, 66 is switched off and the welding connection is cooled with an optional force influence of the welding electrodes 64, 66.

FIGS. 19 a to f show the setting of the welding auxiliary joining part 10 against an anvil 50 with oval recess 52. During the setting procedure, the welding auxiliary joining part 10 is deformed into the recess 52 and thereby forms a welding head 62 protruding beyond the component 20. At the same time, the welding auxiliary joining part 10 was set with head protrusion so that additional material can be pressed into the welding area/weld nugget 60 during the welding to the component 30 via the electrodes 64, 66 (cf. FIG. 19 e). As can be seen in FIG. 19 f, after the welding the head 12 is arranged flush at the component 20 and the component 20 is arranged flush at the component 30. Thus, preferably a resistance stud welding takes place due to the protrusion of the welding head 62 and the head 12 while for resistance welding without protrusion at the head 12 and the welding head 62 a resistance spot welding is preferably assumed. In case the welding head comprises preferably the geometric tip shape 63, a stud welding with arc is used preferably.

To support the composition or compound of the at least one component 20 and the at least one component 30, an adhesion layer 70, 72 is arranged between the components 20, 30 or 22, 30 preferably before welding. In the same manner, it is also preferred to arrange an adhesive layer 70 between pluralities of first components 20, 22 before driving-in the welding auxiliary joining part 10.

After completion of the welding process, a composite or compound of at least one component made of non- or poorly weldable material and at least a second component 30 made of weldable material is present, preferably in the shape of a vehicle part or a vehicle. The above-mentioned component 20 was provided by means of a setting procedure, preferably a high speed joining, with a weldable welding auxiliary joining part 10 at which a welding head 62 was created during the setting procedure by mechanical deformation. As the welding auxiliary joining part 10 with welding head 62 was set only into the at least one first component 20 made of non- or poorly weldable material, a connection between the second component 30 made of weldable material and the welding auxiliary joining part 10 was produced by means of welding. As the welding auxiliary joining part 10 is fixedly connected to the first component 20, a reliable connection between the first component 20 and the second component 30 is present in this way. Alternatively, the component 20 with set welding auxiliary joining part 10 is welded to a component 30 which consists of poorly weldable material. For this purpose, at least one welding auxiliary joining part 10 or a weldable joining part known from the prior art was set into the component 30 and subsequently welded to the welding head 62 of the welding auxiliary joining part 10 in component 20.

In modification to the above described connection method consisting of the setting procedure of a welding auxiliary joining part and an indirect or direct welding of the welding auxiliary joining part to a further component, also the following procedure is possible. First, a joining element having a head is set into the component made of non-weldable material and held via a closing head. The closing head is for example formed during setting of the joining element against an anvil. The setting head existing at the joining element prior to the setting procedure simultaneously serves as welding head in a resistance welding with the further component made of weldable material or the further component with an additional welding auxiliary joining part made of weldable material.

The invention claimed is:

1. A welding method for connecting at least one first component made of non-weldable or poorly weldable material having a welding auxiliary joining part set therein with a mechanically compressed tip portion of the welding auxiliary joining part and at least one second component made of weldable material or at least one second component with portions made of weldable material, comprising the following steps:
  a. driving the welding auxiliary joining part into the at least one first component by an impulse force, wherein the welding auxiliary joining part is a stud comprising a tip portion extending into the longitudinal direction of the welding auxiliary joining part, wherein the tip portion comprises only one central tip to which the tip portion of the stud tapers continuously or stepwise and wherein the tip portion further comprises a maximum thickness adjacent to a head or to a shank of the welding auxiliary joining part so that,
  b. no setting slug is separated from the at least one first component, and
  c1. upon exiting of the welding auxiliary joining part out of the at least one first component at an exit location, compressing the welding auxiliary joining part at an anvil being arranged at the exit location of the welding auxiliary joining part out of the at least one first component during the setting so that the welding auxiliary joining part directly contacts the anvil at the exit location, an axial material displacement in drive-in direction is restricted or prevented, the material of the welding auxiliary joining part is pressed in radial direction and the tip portion of the welding auxiliary joining part is at least partly deformed into a welding head providing a contact surface for welding, or
  c2. upon exiting of the welding auxiliary joining part out of the at least one first component at an exit location, compressing the welding auxiliary joining part at a supporting component of high strength weldable material being arranged at the exit location of the welding auxiliary joining part out of the at least one first component during the setting so that the welding auxiliary joining part contacts the supporting component and the supporting component provides a non-deformable surface, an axial material displacement in drive-in direction is restricted or prevented, the material of the welding auxiliary joining part is pressed in radial direction and the tip portion of the welding auxiliary joining part is at least partly deformed into a welding head providing a contact surface for welding, thereafter
  d. bringing the welding auxiliary joining part set into the at least one first component without separating a setting slug from the at least one first component into contact with the at least one second component made of weldable material or into contact with at least one of the portions made of weldable material of the at least one second component at the mechanically compressed tip portion of the welding auxiliary joining part; and
  e. welding the at least one first and the at least one second component to each other via the welding auxiliary joining part of the at least one first component.

2. The welding method according to claim 1, wherein the at least one second component comprises a further welding auxiliary joining part.

3. The welding method according to claim 1, wherein the at least one first component and the at least one second component are welded to a shape of the deformed tip portion of the welding auxiliary joining part by resistance stud welding, resistance spot welding or stud welding with electric arc.

4. The welding method according to claim 1, wherein the driving-in takes place by an impulse force accelerating the welding auxiliary joining part up to a velocity of at least 5 m/s.

5. The welding method according to claim 1, wherein the welding auxiliary joining part is compressed at the anvil being flat or the anvil having a depression surface contour.

6. The welding method according to claim 1, wherein the stud has a head and the tip portion, wherein a head diameter is greater than the maximum thickness of the tip portion, and wherein, after completion of the setting, the stud is arranged with a head underside facing the at least one first component onto the at least one first component or is spaced therefrom.

7. The welding method according to claim 1, wherein the stud has a head with a head diameter not exceeding the maximum thickness of the tip portion, and wherein, after completion of the setting, the stud with the head is arranged flush with the at least one first component or protrudes therefrom.

8. The welding method according to claim 1, wherein the welding head of the welding auxiliary joining part is arranged flush with a side of the at least one first component or protrudes from a side of the at least one first component having the exit location of the welding auxiliary joining part.

9. The welding method according to claim 5, wherein the welding auxiliary joining part is the stud having a head and the tip portion, wherein a head diameter is greater than a maximum thickness of the tip portion, and wherein, after completion of the setting, the stud is arranged with a head underside facing the at least one first component onto the at least one first component or is spaced therefrom.

10. The welding method according to claim 5, wherein the welding auxiliary joining part is the stud having a head with a head diameter not exceeding a maximum thickness of the tip portion, and wherein, after completion of the setting, the stud with the head is arranged flush with the at least one first component or protrudes therefrom.

11. The welding method according to claim 5, wherein the welding head of the welding auxiliary joining part is arranged flush with one side of the at least one first component or protrudes from a side of the at least one first component having the exit location of the welding auxiliary joining part.

12. The welding method according to claim 6, wherein the welding head of the welding auxiliary joining part is arranged flush with one side of the at least one first component or protrudes from a side of the at least one first component having the exit location of the welding auxiliary joining part.

13. The welding method according to claim 7, wherein the welding head of the welding auxiliary joining part is arranged flush with one side of the at least one first component or protrudes from a side of the at least one first component having the exit location of the welding auxiliary joining part.

* * * * *